United States Patent [19]

Wetta

[11] Patent Number: 4,910,441
[45] Date of Patent: Mar. 20, 1990

[54] AUDIO LOADING MODULATED SIDE PINCUSHION CORRECTION CIRCUIT

[75] Inventor: Steven C. Wetta, Greenwood, Ind.

[73] Assignee: Thomson Consumer Electronics, Inc., Indianapolis, Ind.

[21] Appl. No.: 312,549

[22] Filed: Feb. 21, 1989

[51] Int. Cl.$^4$ .............................................. H01J 29/56
[52] U.S. Cl. ...................................................... 315/371
[58] Field of Search ................................. 315/370, 371

[56] References Cited

U.S. PATENT DOCUMENTS

| | | | |
|---|---|---|---|
| 4,129,806 | 12/1978 | Haferl | 315/370 |
| 4,184,104 | 1/1980 | Shouse, Jr. | 315/371 |
| 4,223,251 | 9/1980 | Haferl | 315/370 |
| 4,254,365 | 3/1981 | Knight | 315/371 |
| 4,298,829 | 11/1981 | Luz | 315/408 |
| 4,604,556 | 8/1986 | Haferl | 315/411 |

OTHER PUBLICATIONS

Co-pending application Ser. No. 190,983 entitled Raster Size Regulating Circuit—Fernsler.

Co-pending application Ser. No. 273,529 entitled Power Supply Protection Circuit—Wilber, et al.
RCA Field Service Guide, vol. 10, pp. 37 & 43.

Primary Examiner—Thomas H. Tarcza
Assistant Examiner—Gregory C. Issing
Attorney, Agent, or Firm—Joseph S. Tripoli; Joseph J. Laks; Harvey D. Fried

[57] ABSTRACT

The power demand of a dynamic audio load is monitored, for example, by sensing the voltage level of the power supplying the audio load. An audio load control signal corresponding to the power demand is generated. The audio load control signal is advantageously applied to a circuit for producing a side pincushion correction current, for modulating the side pincushion correction current by the audio load demand. The audio load modulated side pincushion correction current is used to modulate a horizontal deflection current in order to compensate for both side pincushion distortion and dynamic audio load induced raster width distortion. A filter network may also be provided for removing high frequency signal components from the audio load control signal.

20 Claims, 1 Drawing Sheet

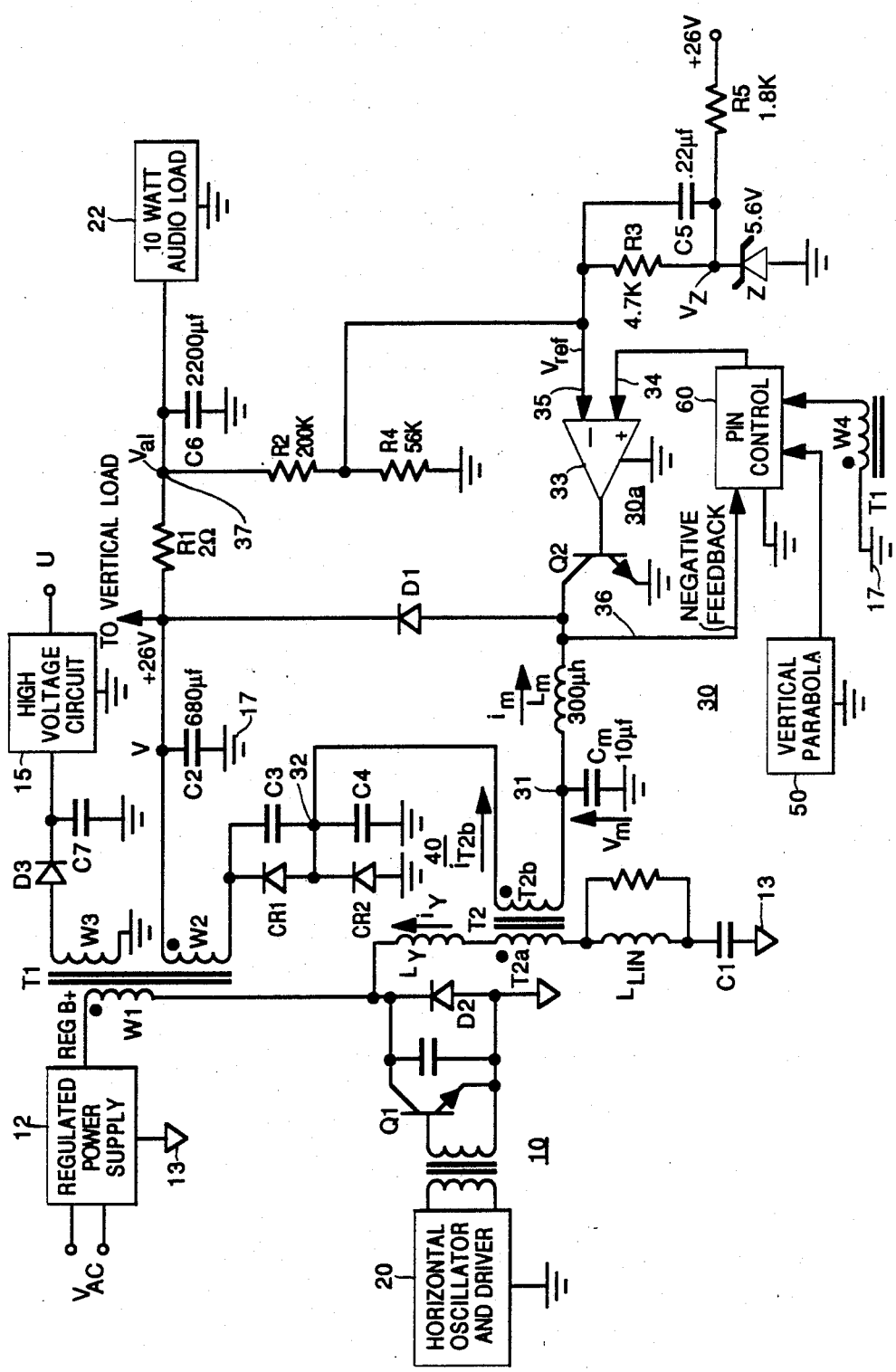

AUDIO LOADING MODULATED SIDE PINCUSHION CORRECTION CIRCUIT

The invention relates to a circuit in a television apparatus for controlling raster width distortion due to dynamic audio loading.

The raster of a television picture will not have straight edges if deflection is not uniform at the edges of the raster, compared with the center. Pincushion distortion is a problem with large-screen picture tubes. If the faceplate is almost flat, the distance from the point of deflection to the corners of the screen is longer. The electron beam is deflected more than at the center, resulting in a raster with the scanning lines bowed inwardly and the corners stretched outwardly. Pincushion distortion is often more severe with wide-angle picture tubes of 90 degrees or more. Pincushion distortion in monochrome picture tubes may be corrected by permanent magnets mounted on the housing, however, pincushion magnets cannot be used with color picture tubes, because the magnets would affect the three beams by different amounts, causing more problems with color purity and convergence. Accordingly, dynamic pincushion correction is used with color picture tubes.

Pincushion correction signals are applied to the scanning coils of a deflection yoke. Horizontal scanning coils are driven by a side pincushion correction current to straighten the sides of the raster. Vertical scanning coils are driven by a top to bottom pincushion correction current to straighten the top and bottom of the raster. In order to correct horizontal pincushion distortion, also referred to as side or East-West pincushion distortion, the sides of the raster must be pushed out at the center. More horizontal scanning current is needed for the horizontal lines produced midway between the top and bottom of the raster. Side pincushion correction may be achieved by modulating horizontal deflection current at the vertical scanning rate of 60 Hz. The resulting vertical modulation is a 60 Hz parabolic waveform, which stretches the width of the horizontal lines in the middle of the vertical scan but not at the start and finish.

Raster size will vary with certain loading conditions, for example, beam current loading. Beam current loading is a function of brightness, the need for illuminating a bright picture tending to load the power supply and result in an improper raster width. Circuits have been developed for controlling raster width by monitoring beam current and developing a feedback signal for modulating a side or East-West pincushion correction circuit.

Another loading factor which can be very disruptive of proper raster width maintenance is dynamic audio loading. Dynamic audio loading may be particularly troublesome in those television apparatus having enhanced sound systems such as stereo television receivers, which require more power for audio operation. The particular adverse effect of heavy audio loading on raster width is a condition whereby the width of the raster cyclically and perceptibly varies at a frequency related to the audio signal. The condition tends to manifest itself at frequencies in the range of approximately 1 Hz to 30 Hz. Efforts have been made to control the effect of audio loading on raster width by controlling the primary power source for the receiver or television apparatus. The solution may be effective under some circumstances, but is undesirable in so far as the voltage level of the power source is thereby unnecessarily raised for other loads in the receiver.

It is an aspect of the invention to control raster width distortion from dynamic audio loading by modulating the side pincushion correction circuit of a television apparatus. It is a further aspect of the invention to monitor audio loading and to develop an audio load control signal for modulating the correction current produced by the side pincushion correction circuit. The power supply source for the audio circuit may be monitored directly and a control signal proportional to the voltage may be developed. Reductions in the voltage level of the power supply for the audio load is a reliable indication of a detrimental load factor which must be corrected in order to prevent distortion of raster width.

Diode modulators are known for controlling side pincushion correction. Such diode modulators often include a control circuit which has a differential amplifying input stage having inverting and noninverting inputs. Such a control circuit may generate a modulation sink current having a controllable average value which sets a voltage level in an energy storage device. The voltage level controls the diode modulator. A reference voltage may be applied to one input of the differential amplifier input stage. A negative feedback current having a DC or average value that is proportional to the voltage level in the energy storage device, during any given horizontal period, may be fed to the other input of the differential amplifier input stage.

In accordance with an aspect of the invention, an audio loading control signal enables regulation of raster width notwithstanding variations in dynamic audio loading. A voltage signal which is related to audio loading may be combined with or otherwise coupled to the reference voltage in order for the control circuit to further compensate for raster width distortion under significant audio loading conditions. The coupling may be achieved by algebraically summing the voltages. It may also be desirable under certain circumstances to couple the voltage signal related to audio loading to the side pincushion waveform feedback signal, although it may be necessary to provide an inverted audio load control voltage signal.

In accordance with another aspect of the invention, an audio loading control signal may be applied to a side pincushion correction circuit to avoid unnecessary increases in supply voltages utilized by other loads in the television apparatus. For example, there is no significant concurrent modulation of the ultor voltage. The audio loading control signal may be applied to modulate only the side pincushion correction current.

In accordance with the foregoing aspects of this invention, the power demand of a dynamic audio load is monitored, for example, by directly sensing the voltage output level of the power supply for the audio load with a sense resistor. An audio load control signal is generated, corresponding to the dynamic audio power demand. The audio load control signal is advantageously applied to the correction current producing circuit for modulating the side pincushion correction current by the audio load power demand. The audio load modulated side pincushion correction current may then be advantageously used to modulate a horizontal deflection current in order to compensate for both side pincushion distortion and dynamic audio load induced raster width distortion. A filter network, which may include a capacitor, may also be advantageously provided for removing high frequency signal components from the audio feedthrough signal.

The sole FIGURE illustrates an East-West raster distortion correction circuit of a horizontal deflection circuit that includes a side pincushion correction circuit modulated by an audio load control signal from a dynamic audio load source.

A horizontal deflection circuit output stage 10 also operates as a power supply for generating a supply voltage V. The associated power supply circuitry, including the horizontal deflection circuit output stage, 10, shown in schematic form in the FIGURE, is similar to that disclosed in detail in commonly owned copending application Ser. No. 273,529, entitled POWER SUPPLY PROTECTION CIRCUIT, by Wilber, et al., the teachings of which are incorporated herein by reference.

The output stage 10 includes a deflection switching transistor Q1 and diode D2. A regulated power supply 12, coupled to an AC voltage source, develops a regulated input supply voltage B+, for example +126 V. The power supply 12 is of the type regulated by a silicon controlled rectifier SCR, as is well known. The invention may be adapted for use with receivers having other types of power supplies, as explained hereinafter. A primary winding W1 of a flyback transformer T1 is coupled between the input supply voltage B+ and the collector electrode of transistor Q1. A horizontal deflection winding $L_y$, a linearity inductor $L_{LIN}$, a primary winding T2a of a transformer T2 of an East-West pincushion distortion correction circuit 30 and a trace capacitor C1 form a series arrangement coupled between the collector of transistor Q1 and ground. Transistor Q1 is switched at a horizontal rate in accordance with a drive signal that is developed at its base electrode. The drive signal is produced in a horizontal oscillator and driver stage 20 in a well known manner. The switching operation of transistor Q1 produces a horizontal deflection current $i_y$.

Transformers T1 and T2 electrically isolate, with respect to electrical shock hazard, voltage V and control circuit 30a from voltage B+ and from AC mains supply voltage $V_{AC}$. Voltage B+ is electrically nonisolated with respect to electrical hazard from AC mains supply voltage $V_{AC}$ used for producing voltage B+. Thus transformers T1 and T2 provide an isolation barrier. The hot, or electrically nonisolated ground is designated by reference numeral 13 and the cold, or electrically isolated ground is designated by reference numeral 17.

A secondary winding W3 of flyback transformer T1 includes a rectifying filtering means, including capacitor C7 and diode D3 for developing a DC power supply source, having a first output voltage level for driving a high voltage circuit 15, for example, the ultor circuit. Loading of the power supply circuit, for example from a dynamic audio load, may reduce the ultor voltage U through the magnetic coupling of the flyback transformer. A reduction in ultor voltage will cause the raster width to expand, as the electron beams move too slowly through the deflection zone, and are deflected further than necessary, left and right. In receivers having certain power supplies, for example those having SCR regulators, dynamic audio loading may result in an increase in the amplitude of the retrace pulses. The increase in amplitude increases the ultor voltage. This tends to decrease the raster width as the electron beams move too quickly through the deflection zone, and are not deflected far enough, left and right.

Another secondary winding W2 of flyback transformer T1 has a first terminal coupled to filter capacitor C2, forming part of another rectifying and filtering means for developing another DC power supply source at a second output voltage level, denoted as voltage V. A second terminal of winding W2 is coupled via a rectifier arrangement to ground. The rectifier arrangement, including diodes CR1 and CR2 and capacitors C3 and C4, operates as the output stage 40 of a diode modulator, for modulating the horizontal deflection current by a side pincushion correction current. The diode modulator is generally considered to also comprise transistor Q1, diode D2, inductor $L_m$ and capacitor $C_m$.

During trace, when transistor Q1 is conductive, a trace voltage approximately equal to voltage B+ is developed in winding W1 of flyback transformer T1. During trace, a voltage forming a trace portion of an AC voltage is developed by transformer action across winding W2. In accordance with the operation of the rectifier arrangement, the voltage across winding W2 produces a half wave rectified current in winding W2, which is coupled to filter capacitor C2 and to receiver load circuits, for example, vertical and audio loads, as shown. The 2 ohm resistor R1 reduces the extent to which vertical signals are coupled to the audio load.

In normal operation, during trace, a current flows in a current path that includes the diodes of the rectifier arrangement of output stage 40 in a forward direction, that causes the diodes to be conductive. Consequently, voltage V is equal to the value of voltage B. multiplied by the turn ratio between windings W2 and W1. During retrace, when transistor Q1 is nonconductive, a relatively high retrace voltage of the opposite polarity is developed across winding W1. A retrace pulse voltage is developed in winding W2 of the opposite polarity to the polarity during trace, causing the diodes to operate as a nonconductive switch. Thus, in normal operation, the diodes are conductive throughout trace and nonconductive during retrace.

Pincushion distortion correction circuit 30 includes the transformer T2. A secondary winding T2b of transformer T2 has a first terminal 31 coupled to a modulation voltage developing capacitor $C_m$. The other terminal 32 is coupled between the diodes of the rectifier arrangement of output stage 40. Voltage $V_m$ across capacitor $C_m$ produces an oscillatory current $i_{T2b}$.

During horizontal retrace, when the diodes of output stage 40 are nonconductive, a retrace voltage developed in winding T2b causes current $i_{T2b}$ in winding T2b to reverse its direction and to flow in the direction shown by the arrow at the end of retrace and during the first half of trace. At the same time, a retrace voltage is developed at terminal 32. During the second half of trace, trace current $i_{T2b}$ flows in the opposite direction to that of the arrow.

A control circuit 30a of pincushion distortion correction circuit 30 is coupled to terminal 31 of capacitor $C_m$. Control circuit 30a produces a modulation sink current $i_m$ having a controllable average value that controls voltage $V_m$ in capacitor $C_m$ in accordance with the average value DC component of current $i_m$. When the average value of sink current $i_m$ is zero, for example, voltage $V_m$ is at a maximum. On the other hand, when the average value of current $i_m$ is at a maximum, voltage $V_m$ is at a minimum.

Modulation voltage $V_m$ is controlled by control circuit 30a and establishes in turn, by the transformer action of transformer T2, the level of voltage across primary winding T2a of transformer T2. Thus, the voltage across winding T2a is modulated in accordance with voltage $V_m$ or current $i_m$. The voltage across winding T2a is applied in a direction that causes the trace voltage across deflection winding $L_y$ to be smaller than the voltage developed across trace capacitor C1.

When the average value of current $i_m$ is at a minimum, the consequent maximum voltage across winding T2a causes the amplitude of deflection current $i_y$ to be at a minimum. On the other hand, when the average value of current $i_m$ is at a maximum, the consequent minimum voltage across winding T2a results in the amplitude of deflection current $i_y$ being at a maximum.

Control circuit 30a which produces the sink current $i_m$, includes an input stage having a differential amplifier 33 and an output stage having a switching transistor Q2. Differential amplifier 33 has noninverting and inverting input terminals 34 and 35, respectively. A voltage reference signal $V_Z$ is developed across Zener diode Z. The Zener diode Z may be further coupled through a biasing resistor R5 to a voltage source, for example, the +26 V supply. In the illustrated circuit, voltage reference signal $V_Z$ is 5.6 volts. The base of transistor Q2 is coupled to the output of differential amplifier 33. The emitter of transistor Q2 is coupled to ground. The collector of transistor Q2 is coupled via an inductor $L_m$ to capacitor $C_m$. The collector of transistor Q2 forms a switching output terminal for producing the sink current $i_m$ in inductor $L_m$ that provides East-West pincushion distortion correction. Transistor Q2 also effects a signal inversion of the output from differential amplifier 33.

A horizontal retrace pulse signal is coupled from a winding W4, another secondary winding of flyback transformer T1, to a pin control circuit 60. During horizontal retrace, the retrace pulse signal in winding W4 is used to generate a sawtooth signal in pin control circuit 60. The sawtooth signal is modulated by a vertical parabola signal, produced by vertical parabola generator 50, to generate a side pincushion correction waveform When the voltage level at the noninverting input 34 of differential amplifier 3 exceeds a reference voltage $V_{ref}$ at inverting input 35 during trace, transistor Q2 will be turned on to produce the side pincushion modulating sink current $i_m$. After transistor Q2 is turned off during trace, sink current $i_m$ continues flowing, as a result of the magnetic energy stored in inductor $L_m$, in a current path that includes a diode D1. Diode D1 is coupled between the collector of transistor Q2 and voltage supply V.

The signal at the noninverting input of the differential amplifier will vary in a vertical rate parabolic manner. The result is that the length of the interval when transistor Q2 is conductive, and hence each of volta $V_m$ and the average value of current $i_m$, varies at a vertical rate in parabolic manner.

A negative feedback path 36 is coupled between the collector of transistor Q2 and pin control circuit 60. The feedback path produces a negative feedback current having, during a given horizontal period, a DC or average value that is proportional to voltage $V_m$. As a result of the negative feedback, voltage $V_m$ is closely controlled in a closed loop and varies in a parabolic manner.

As a result of the parabola modulation, the instant within horizontal retrace when transistor Q2 becomes conductive occurs earlier at the center of vertical trace than at the top and bottom. Hence, each of the average value of current $i_m$ that sinks charge from capacitor $C_m$ in each horizontal period and the level of volta $V_m$ is at a maximum at the center of vertical trace and at a minimum at the top and bottom of vertical trace. Consequently, the amplitude of deflection current $i_y$ is at a maximum at the center of vertical trace and at a minimum at the top and bottom, thereby providing East-West pincushion distortion correction. A potentiometer, not shown, may be coupled to one of the inverting and noninverting inputs to provide width adjustment Audio loading modulation of the side pincushion correction circuit in accordance with an aspect of the invention does not interfere with the operation of the high voltage power supply and power supply protection circuits, which are not shown in detail. An audio load 20 is powered by the +26 volt power supply source developed across capacitor C2 from current flowing through winding W2. Dynamic audio loads, which may be in excess of 1 watt per channel, for example, 5 watts in each channel of a stereo television receiver, will significantly load the +26 volt power supply. In the absence of some correction responsive to such audio loading, the raster width will become distorted notwithstanding the side pincushion correction and the B+ regulation.

In accordance with an inventive aspect, the audio loading is monitored or sensed, for example by a voltage divider network including resistors R2, R3 and R4. Resistors R3 and R4 are effectively connected in parallel. The input of the network is at terminal 37. The output of the network is the common junction of resistors R2, R3 and R4, at the inverting input 35 of the differential amplifier 33. The voltage at terminal 37 is proportional to the extent of audio loading, and serves as an audio load control signal in the form of an audio load voltage reference signal $V_{al}$. The amount of voltage signal $V_{al}$ causes a very small current to flow through resistor R2, for example, on the order of 0.1 milliamperes. $V_{al}$ is reduced in magnitude at the output of the voltage divider to a level compatible with the operating parameters of differential amplifier 33. Amplifier 33 presents a high input impedance. A fixed voltage reference level $V_z$ is developed by the Zener diode Z. Voltage level $V_z$ and the audio load control voltage reference signal $V_{al}$ are combined, for example algebraically summed, at inverting input 35. The combination forms a composite voltage $V_{ref}$ proportional to the sum of the Zener voltage $V_z$ and the audio load control voltage $V_{al}$.

The voltage $V_{al}$ is referred to as a control signal, rather than a feedback signal, because $V_{al}$ is not part of a closed loop control circuit. There is no direct feedback control over the power supply source for the audio load, responsive to variations at $V_{al}$, nor on any other power supply source. On the contrary, $V_{al}$ is on an open loop signal path which terminates at the horizontal deflection circuit, producing more or less deflection current, as needed to compensate for audio loading. The system response of feedthrough control signals is normally undesirable, as system response among units tends to differ widely according to the random tolerance variations of each element in each circuit of each unit. However, $V_{al}$ passes through and becomes part of a closed loop control circuit which includes a negative feedback signal path, namely negative feedback signal path 36 in the side pincushion control circuit. Therefore, the control circuit according to the invention is not subject to the unacceptable random tolerance variations as would otherwise be expected.

The effect of $V_{al}$ on raster width can be appreciated by following the effect of $V_{al}$ on the side pincushion correction current and the side pincushion correction current circuit. The pin control circuit 60 receives as inputs horizontal retrace pulses from secondary winding W4 of flyback transformer T1 and a vertical rate parabola from signal generator 50. The retrace pulse signal is used to generate a sawtooth signal which is modulated by the vertical rate parabola. This results in a positive polarity side pincushion correction waveform being generated as an input to noninverting input 34 of differential input amplifier 33. Ignoring the effect of $V_{al}$ for the moment, the positive polarity side pincushion correction signal appears at the output of differential input amplifier 33. Output transistor Q2 effects a signal inversion, resulting in a negative polarity side pincushion correction signal at the collector of transistor Q2. This inverted output signal is sampled through negative feedback line 36 and is the source for a negative polarity feedback correction signal for controlling the side pincushion correction waveform. Voltage $V_m$ across capacitor $C_m$ tracks the negative polarity signal through the action of sink current $i_m$. Accordingly, the side pincushion correction current, in the form of a negative polarity signal, is coupled from winding T2b to winding T2 of transformer T2, where it is subtracted from the trace voltage, which essentially corresponds to the B+ voltage level, across trace capacitor C1. The subtraction of the negative polarity correction current from the trace voltage has the effect of adding the correction current to the trace voltage. This results in additional voltage toward the center of trace, which tends to widen the raster and correct for side pincushion distortion.

Assume, for purposes of illustration, that power supply 12 is of the kind which will increase the amplitude of the retrace pulses responsive to dynamic audio loading, for example due to SCR regulation. An increase in dynamic audio load will result in a decrease of $V_{al}$. The sum of $V_{al}$ and $V_z$ will also decrease at the inverting input 35 of differential input amplifier 33. By reason of application to the inserting input, the decrease of $V_{al}$ will result in an increase in the output voltage of amplifier 33, thereby increasing the amplitude of the side pincushion correction current. More precisely, lowering the reference voltage $V_{ref}$ enables the amplifier 33 and transistor Q1 to begin sinking current $i_m$ sooner in time, and for a longer period of time, which effectively increases the sink current $i_m$. The output of transistor Q2 will therefore exhibit a side pincushion correction current having a greater negative amplitude, which will b coupled through transformer T2 and create a greater negative amplitude signal to be subtracted from the B+ trace voltage. This will result in an even larger trace voltage, which will expand the raster width and counteract the tendency of the raster width to contract due to increased audio loading. At the same time, the component of $V_{al}$ by which the side pincushion correction current is modified will also be sensed on negative feedback line 36, obviating most of the undesirable effects which might otherwise be expected from utilizing an open loop control signal. The feedback signal is essentially a composite raster width and side pincushion correction negative feedback signal.

If the power supply is such that dynamic audio loading results n expansion of the raster width, then the audio load control signal $V_{al}$ may be coupled to the side pincushion correction waveform at the noninverting input 34 of differential amplifier 33. This would result in the side pincushion correction waveform being decreased in amplitude, which would eventually result in a smaller amplitude signal being subtracted from the retrace voltage, which would reduce raster width.

For each of the effects on raster width, due to the operating characteristics of the power supply circuits, alternative coupling of audio load control signal $V_{al}$ may be effected. Means may be provided for reversing the polarity of the audio load control voltage or otherwise sensing the audio load so as to produce an audio load control signal of opposite polarity. Such a negative polarity signal may be combined with the signal fed to other inputs of the amplifier 33, for example by algebraic summing. It will therefore be appreciated that a further aspect of the invention provides a closely controlled negative feedback signal path for both audio and video processing. Moreover, there is no significant concurrent modulation of other control voltages, for example, the ultor voltage U.

Capacitive filtering means may be associated with the power supply developing voltage V or the audio load 26, for example capacitors C2 or C6. These generally remove audio frequency components of approximately 500 Hz and higher. Accordingly, the audio load control signal $V_{al}$ will still tend to include high frequency audio components, for example up to 500 Hz, which makes the signal unsuitable for a control signal. A filter network including the resistor R3 and a capacitor C5 coupled in parallel thereto may be coupled between inverting input 35 and the cathode of Zener diode Z. The filter formed by resistor R3 and capacitor C5 provides a path for removing the high frequency components in $V_{al}$ by shunting the high frequency components away from the differential amplifier to ground. The cathode of Zener diode Z forms an effective AC ground for this purpose. The filter illustrated in the FIGURE will shunt frequency components equal to and in excess of approximately 25–30 Hz. The existing capacitors in the power supply and/or audio load circuits are effective capacitive filtering means, as noted, for frequency components in excess of, for example, 500 Hz. The remaining frequency components, for example, approximately 1 Hz to 25–30 Hz, which are primarily responsible for audio bop, can be closely tracked and compensated for by the differential amplifier 33. Resistor R4 is a compensation resistor, which may be used to center the range of pincushion correction by adjusting the range of the potentiometer, not shown, to compensate for the effect of the audio load control circuit n the pin correction range.

A changing audio load will cause a variation in the audio load control voltage $V_{al}$, which will effectively change the voltage at one of the inputs of the differential amplifier. Under such circumstances, control circuit 30a will begin sinking current $i_m$ sooner or later in time than would otherwise have been the case, increasing or decreasing the voltage $V_m$ in a manner that maintains proper raster width. Accordingly, more or less sink current $i_m$ will flow in a manner which is directly elated to dynamic audio loading, so as to automatically compensate for the tendency of the raster width to vary with audio loading, in addition to compensating for side pincushion distortion.

What is claimed is:

1. A raster distortion corrected horizontal deflection circuit for a television apparatus, comprising:
 a horizontal deflection circuit for generating horizontal deflection current;
 a side pincushion distortion correction control circuit for producing a side-pincushion correction current;
 a power supply source;
 a dynamic audio load powered by the power supply source;
 a capacitive filtering means coupled to the audio load;
 means coupled to the side pincushion distortion correction control circuit and responsive to an audio load control signal for modulating the side pincushion correction current in accordance with dynamic audio loading;
 means for removing high frequency signal components in the audio load control signal, not already removed by the capacitive filtering means; and,
 means for modulating the horizontal deflection current in accordance with the audio load modulated side pincushion correction current to correct side pincushion distortion and dynamic audio loading induced raster width distortion.

2. The circuit of claim 1, wherein the side pincushion correction circuit comprises:
 an amplifier for producing the side pincushion correction current as an output, the amplifier having a differential input stage with inverting and noninverting inputs;
 means for generating a side pincushion correction waveform signal coupled to one input of the differential input stage;
 means for generating a voltage reference signal coupled to the other input of the differential input stage;
 means for combining the audio load control signal with one of the side pincushion correction waveform signal and the voltage reference signal;
 means for monitoring the correction current and generating a negative feedback signal coupled to the waveform generating means.

3. The circuit of claim 2, comprising a resistive voltage divider network for monitoring the power supply and coupling the audio load control signal to one of the inputs of the differential input stage and to the high frequency signal component removing means.

4. The circuit of claim 2, comprising:
 a first resistor and a capacitor coupled together as a parallel network for shunting the high frequency signal components in the audio load control signal from the differential input stage;
 a Zener diode for generating the voltage reference signal, coupled in series to one junction of the first resistor and the capacitor; and,
 a second resistor coupled in series between the power supply and the other junction of the first resistor and the capacitor, the voltage reference signal and the audio load control signal being algebraically summed at one of the inputs of the differential input stage.

5. The circuit of claim 4, wherein the Zener diode ha an anode coupled to ground and a cathode coupled to the junction of the first resistor, the capacitor and one of the inputs of the differential input stage, the cathode of the Zener diode forming an effective AC ground for the frequency components shunted by the parallel network.

6. The circuit of claim 4, further comprising a third resistor coupled to the first resistor for adjusting an operating range for the amplifier.

7. The circuit of claim 1, wherein the capacitive filtering means removes frequency components from the audio load control signal equal of approximately 500 Hz and greater.

8. The circuit of claim 1, wherein the removing means removes frequency components from the audio load control signal in the range of approximately 25 Hz to at least approximately 500 Hz.

9. The circuit of claim 2, wherein the amplifier has a frequency response fast enough to closely track frequency components from the audio load control signal in the range of approximately 1 Hz to approximately 30 Hz.

10. A raster width and side pincushion control circuit, comprising:
 an amplifier having a differential input stage and an output stage;
 means for generating a side pincushion correction waveform signal coupled to the input stage of the amplifier;
 means for coupling an audio load control signal to one of the waveform signal and a reference signal applied to the input stage of the amplifier for providing in an output stage of said amplifier a side pincushion correction output signal modulated by dynamic audio loading;
 means for defining a feedback signal path from the output stage of said amplifier to the input stage that provides negative feedback regulation of said output signal in accordance with both said side pincushion correction waveform signal and said audio load control signal; and
 modulator means coupled to the output stage for modulating a horizontal deflection current to correct for side pincushion distortion and dynamic audio loading induced raster width distortion.

11. The circuit of claim 10, wherein the differential input stage has a noninverting input coupled to the waveform generating means and an inverting input coupled to the audio load control signal and the reference voltage signal.

12. The circuit of claim 10, further comprising means for removing high frequency audio signal components from the audio load control signal.

13. The circuit of claim 12, further comprising means for shunting from the input stage frequency components in the audio load control signal in the range of approximately 25 Hz to at least approximately 500 Hz.

14. A horizontal deflection and audio circuit for a television apparatus, comprising:
 a flyback transformer having a primary winding and at least two secondary windings;
 a regulated power supply coupled to the primary winding;
 a horizontal deflection circuit having a horizontal deflection coil coupled to the primary winding for producing a horizontal deflection current in the deflection coil;
 a high voltage circuit coupled to one of the secondary windings for generating an ultor voltage;
 rectifying and filtering means coupled to another of the secondary windings for developing a DC power supply source at a given output voltage level;

a dynamic audio load coupled to the DC power supply source, operation of which causes variation in the given output voltage level;

means for generating a side pincushion correction signal waveform;

a side pincushion distortion correction control circuit coupled to the waveform generating means for producing a side pincushion correction current;

means coupled to the control circuit for sensing the variation in the given output voltage level and generating an audio power demand control signal for modulating the side pincushion correction current to also correct for raster width distortion resulting from dynamic audio loading; and, a diode modulator output stage coupled to the control circuit and the horizontal deflection circuit for modulating the horizontal deflection current by the audio power demand modulated side pincushion correction current, without thereby producing significant concurrent modulation of said ultor voltage.

15. The circuit of claim 14, further comprising a second transformer having a primary winding coupled in series with the diode modulator output stage and the control circuit and having a secondary winding coupled in series with the horizontal deflection coil.

16. The circuit of claim 14, wherein the control circuit comprises:

an amplifier having a differential input stage with inverting and noninverting inputs, the waveform generating means being coupled to one of the outputs;

means for generating a voltage reference signal coupled to the other of the inputs; and, means for combining the audio power demand control signal with one of the voltage reference signal and the waveform signal.

17. The circuit of claim 16, wherein the noninverting input is coupled to the waveform generating means and the inverting input is coupled to each of the audio load power demand control signal and the reference level signal.

18. The circuit of claim 16, wherein the control circuit further comprises means for inverting the output of the differential amplifier, the inverted output being coupled to the waveform generating means as a composite side pincushion correction and audio power demand negative feedback signal.

19. The circuit of claim 14, further comprising means couple to the sensing means and the control circuit for removing high frequency signal components from the audio power demand control signal.

20. The circuit of claim 19, wherein the frequency signal components removed from the audio power demand control signal are in the range of approximately 25 Hz to at least approximately 500 Hz.

* * * * *

UNITED STATES PATENT AND TRADEMARK OFFICE
CERTIFICATE OF CORRECTION

PATENT NO. : 4,910,441

DATED : March 20, 1990

INVENTOR(S) : Steven C. Wetta

It is certified that error appears in the above-identified patent and that said Letters Patent is hereby corrected as shown below:

Col. 9, line 63; "ha" should be --has--.

Col. 12, line 22; "couple" should be --coupled--.

Signed and Sealed this

Thirteenth Day of August, 1991

Attest:

HARRY F. MANBECK, JR.

Attesting Officer

Commissioner of Patents and Trademarks